United States Patent [19]

Peters

[11] 3,859,560

[45] Jan. 7, 1975

[54] MULTIVOLTAGE LEVEL PLASMA DISPLAY PANEL SUSTAINER CIRCUITS

[75] Inventor: Edwin F. Peters, Vickery, Ohio

[73] Assignee: Owens-Illinois, Inc., Toledo, Ohio

[22] Filed: July 13, 1973

[21] Appl. No.: 379,179

[52] U.S. Cl. ........... 315/169 TV, 307/202, 307/243

[51] Int. Cl. ............................................ H05b 41/23

[58] Field of Search.................. 315/169 TV, 169 R; 330/207 P; 307/268, 202, 243

[56] References Cited

UNITED STATES PATENTS

| | | | |
|---|---|---|---|
| 3,228,002 | 1/1966 | Reines ............................... | 307/235 |
| 3,349,254 | 10/1967 | Gordon.............................. | 307/243 |
| 3,654,388 | 4/1972 | Slottow et al. ............... | 315/169 TV |

OTHER PUBLICATIONS

NASA Tech. Brief, No. 65–10028, "Transistor Voltage Comparator Performs Own Sensing," SCP & Solid State Technology, 5–1965, p. 22.

*Primary Examiner*—James W. Lawrence
*Assistant Examiner*—Wm. H. Punter
*Attorney, Agent, or Firm*—Donald Keith Wedding; E. J. Holler

[57] ABSTRACT

A system for supplying sustainer voltage waveforms to multicelled gaseous discharge display/memory devices having opposed electrode arrays each subject to a sustainer waveform component. Each wavefore component is developed by a pull-up, pull-medium and pull-down switch to a common sustainer voltage buss. Each switch comprises three transistors in cascade to translate TTL signals to controls for power transistors. The first and second stages of the switching controls employ transistors with a common emitter resistance and base biasing to reduce the possibility of more than one switch being on at any one time due to circuit noise or logic control failure.

10 Claims, 3 Drawing Figures

MULTIVOLTAGE LEVEL PLASMA DISPLAY PANEL SUSTAINER CIRCUITS

BACKGROUND OF THE INVENTION

Baker et al., U.S. Pat. No. 3,499,167 issued Mar. 3, 1970 for "Gas Discharge Display Memory Device and Method of Operating" discloses a multiple celled gas discharge display memory panel which has been characterized as being of the pulsing discharge type. These devices have an ionizable gas, usually a mixture of two gases at a relatively high pressure, in a thin gas chamber. Spaced conductor arrays having at least one dielectric layer between the gas and at least one array to form a dielectric charge storage member are positioned proximate to the gas chamber, frequently as arrays on opposite major faces of the chamber with each array separated from the gas by a dielectric member. The conductor arrays are transversely oriented to define cross points, as viewed along a common perpendicular to the arrays, which define discrete discharge sites or cells.

Charged particles (electrons and ions) are produced upon ionization of the gas at selected discharge sites when proper operating potentials are applied to selected conductors of the opposed arrays in these gas discharge devices. These particles are stored upon the surface or surfaces of the dielectric members at locations in registry with the discharge sites with a charge opposed to the voltage which created the discharge to develop a wall voltage approaching the applied alternating voltage in magnitude as that voltage is neutralized during the discharge. The electrical field created by the charges stored upon the dielectric members aids in initiating subsequent momentary or pulsing discharges on succeeding half-cycles of an applied alternating voltage. The reversal of the applied voltage is aided by the wall voltage from the previous discharge condition of a site in the "on state" of discharge to impose a sufficient voltage across the gas in the site to ignite another ionization discharge. This repetition of discharges in sites having an "on state" wall voltage to augment the applied voltage constitutes a memory.

The alternating voltage has a value between the extremes of its excursions which is insufficient to initiate an ionization discharge in any of the cells of the device yet sustains such an ionization discharge in a site placed in an "on state" of discharge and having an augmenting wall voltage by discharge pulsations every major transition reversal of the applied voltage. This applied voltage has been termed a "sustainer voltage."

Typically a panel of cells has characteristics which tolerates a range of sustainer voltages depending on device geometry, including conductor dimensions, dielectric member thickness, gas chamber thickness, gas composition and gas pressure. Operational sustainer voltages are commonly selected as near the midpoint of the range of sustainer voltages which a device will accommodate in order to provide the best operating margins and accommodate variations from cell to cell within the device.

In dynamic operation, in addition to the sustaining voltages, writing and erasing pulses may be superimposed on and algebraically added to the sustaining voltage waveforms applied to selected transverse conductors in the opposed conductor arrays to manipulate discharge conditions of selected discharge sites defined by those conductors. More particularly, pulses can be applied to conductors in aiding relationship to the then imposed sustainer to apply a voltage across a selected site sufficient to initiate a discharge of sufficient intensity to ignite an ionization discharge in the site and develop a wall voltage of sufficient magnitude to continue that discharge when the sustainer is shifted in the opposite direction. These pulses termed "write signals" are typically applied to opposed conductors with one-half the pulse magnitude applied to each conductor of the opposed arrays which makes up the site. Thus, a number of sites common to the conductor have half signals, termed "half selects" applied without effect. The discharge site of the cross point of opposed conductors having half selects on each conductor and thus a full discharge state manipulating signal imposed is altered by the combined signals. A site in the "on state" is selectively transferred to the "off state" by application of erase partial selects to its opposed conductors. These erase partial selects are in opposition to the sustainer voltage levels then imposed and are of a magnitude to discharge the wall charge of the "on state" site to a level which is insufficient to augment the next sustainer voltage transition to an ionization discharge firing level.

Sustainer voltage waveforms can be of various forms and have been square waves, sine waves, a stepped waves. One preferred form of sustainer waveform is an essentially square, stepped wave, typically having excursions between extremes about 220 volts apart applied at a frequency of 50 kilohertz. Such a waveform is developed by applying half the wave to one array, for convenience termed the $x$ axis, and half to the other array, the $y$ axis, and developing from these component waveforms a composite sustainer waveform of $x - y$.

Clocking of the sustainer components and synchronization of the partial selects with the component and thus the composite sustainer waveforms has been accomplished with TTL logic. Such control functions have involved interfacing circuitry to the users equipment, selection controls for decoding signals and clocking controls to drive a sustainer source and synchronize the partial select pulsers with the sustainer voltages. These controls have been subject to malfunctions which have been detrimental to the extent of destroying power transistor switches in the sustainer source circuitry.

Sustainer component waveforms for each of the opposed conductor arrays have been produced by cascaded transistor switches wherein TTL levels have been applied to the base of first stage transistors to control through the first stage collectors the base potentials of second stage transistors which in turn control at their collectors the base potentials at power transistors to pull up the sustainer component voltage, typically to 110 volts, to pull down the sustainer component voltage, typically to ground, and pull the sustainer component voltage to a level intermediate the pull up and pull down levels, hereafter termed "pull medium," typically 50 volts. All of the pull up, pull down and pull medium power transistors have been connected to a common output to impose the sustainer components on their respective conductor arrays. These common connections can overload the power transistors where two are turned on at the same time. Such concurrent turn on conditions have been attributed to partial or full logic failures and spurious noise signals.

In accordance with the above it is an object of the present invention to improve systems for supplying operating potentials to gas discharge display/memory type devices.

Another object of the invention is to reduce the probability of or to prevent coincident "on" states in the switching circuits for supplying operating potentials to an array of conductors of a gas discharge display/memory type device.

A third object is to reduce the number of components required in the switching circuits for supplying operating potentials to gas discharge display/memory type devices.

SUMMARY OF THE INVENTION

This invention relates to a system for supplying operating potentials to gas discharge display/memory devices and more particularly to a waveform generating means which includes at least two sections for imposing two voltage levels on a common output to such devices. The first section of the generating means is operative to connect a first potential level to the output in response to a clocking signal from a control logic circuit and the second section connects a second potential level to the output in response to a control logic clocking signal.

Each of the output sections includes an output transistor operating as a normally open switching means between its respective source of potential and the output of the wave form generating means. The sections are selectively turned on by a signal to the base electrode of their respective output transistor, the signal being of sufficient magnitude to drive the output transistor into saturation. In order to avoid concurrent "turn on" signals to the output transistors their control circuits are transistors having means to inhibit the "turn on" of more than one section's control at any one time. An emitter resistor common to the control transistors of the sections is arranged to develop a voltage drop in response to the "turn on" of one such transistor which places a reverse bias on the remaining transistor or transistors equal to the amplitude of their input signals. A voltage margin is imposed on the control transistors to develop a "turn on" preference in those instances of equal and coincident "turn on" signals. One such margin developing means is the forward drop of a diode in the base circuit of the control transistor subject to the margin.

DESCRIPTION OF THE PREFERRED EMBODIMENT

Figure 1:
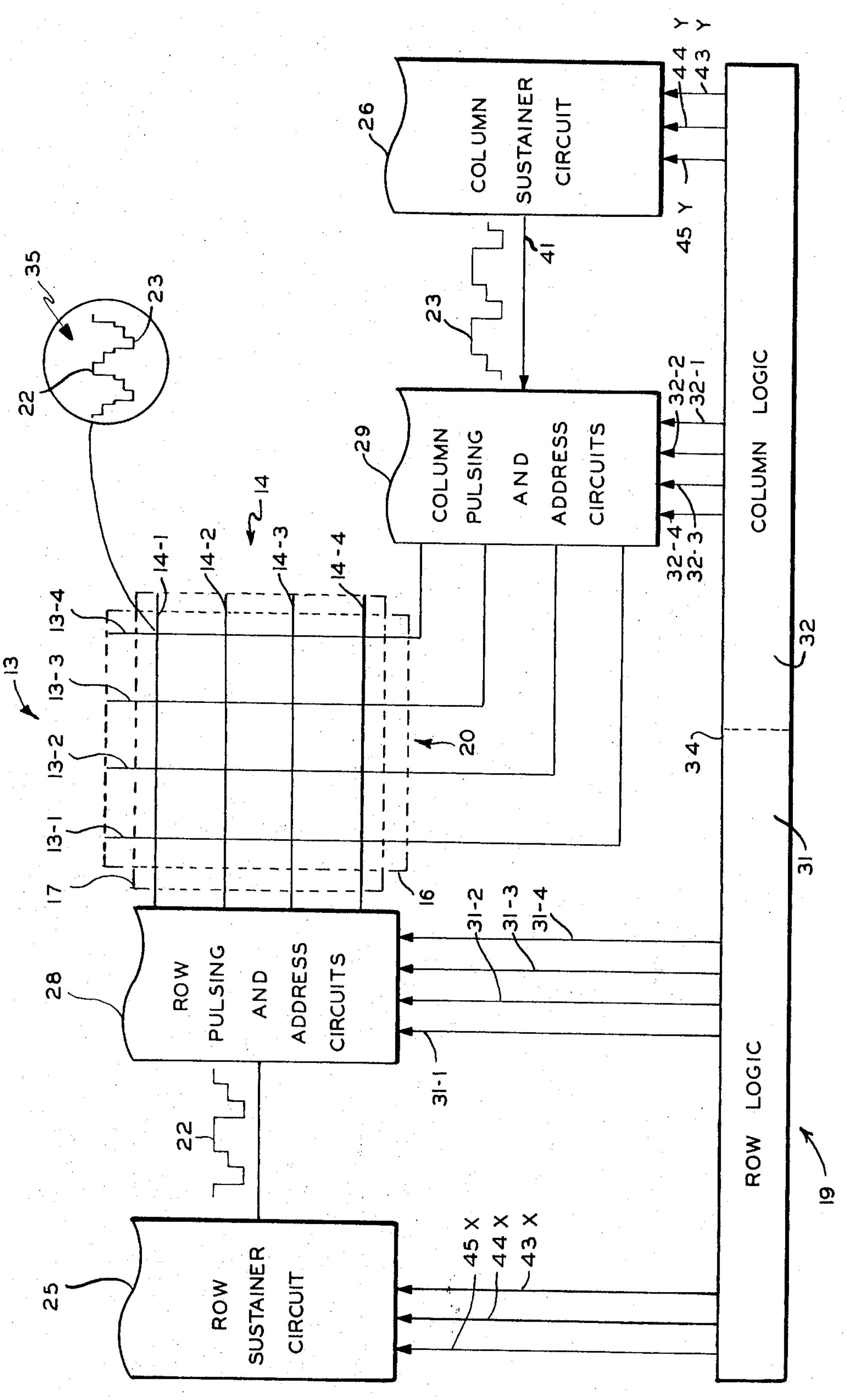
FIG. 1 is a diagrammatic layout of a system for supplying sustaining voltage for a gaseous discharge display/memory panel.
Figure 2:
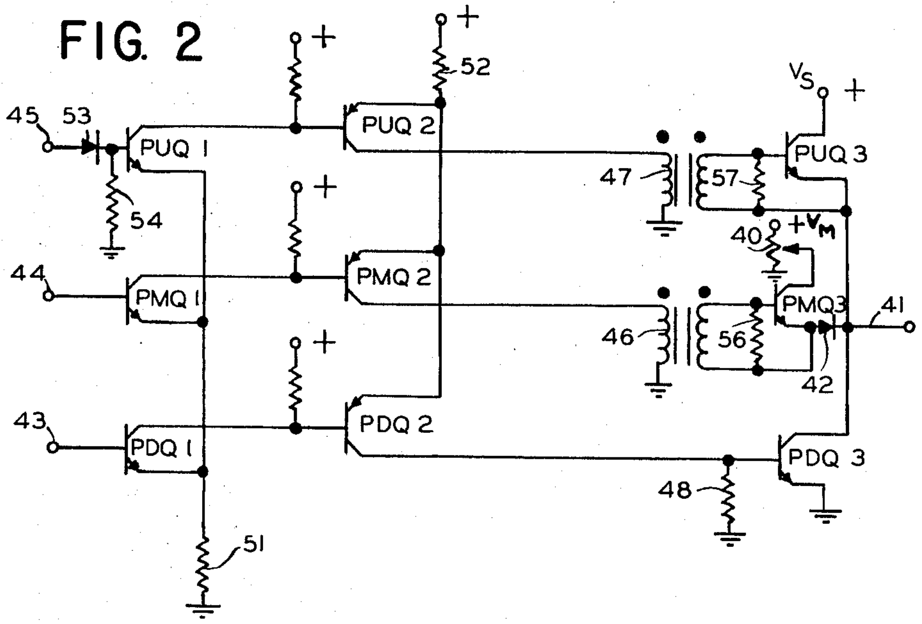
FIG. 2 is a schematic diagram of a circuit according to this invention for supplying sustaining voltage to one array of conductors of the panel.

The gaseous discharge display/memory device, as fully disclosed in the hereinbefore reference Baker et al., U.S. Pat. No. 3,499,167, and indicated generally at 20 in FIG. 1, utilizes a pair of dielectric films separated by a thin layer of a gaseous discharge medium, the medium producing a copious supply of charges (ions and electrons) which are alternately collectible on the surfaces of the dielectric members at opposed or facing elemental or discrete areas defined by the conductor matrix on non-gas-contacting sides of the dielectric members, each dielectric member presenting a large open surface area and a plurality of pairs of elemental or discrete areas. While the electrically operative structural members such as the dielectric members and the conductor matrixes 13 and 14 are all relatively thin they are formed on and supported by rigid nonconductive support members 16 and 17, respectively, as diagrammatically shown in FIG. 1.

Typically, one or both of nonconductive support members 16 and 17 pass light produced by discharge in the elemental gas volumes. Preferably, they are transparent glass members and these members essentially define the overall thickness and strength of the panel. For example, the thickness of gas layer 12, as determined by a spacer is usually under 10 mils and preferably about 4 to 6 mils, the dielectric layers (over the conductors at the elemental or discrete areas) are usually between 1 and 2 mils thick; and conductors 13 and 14 are about 8,000 angstroms thick. However, support members 16 and 17 are much thicker (particularly in large panels) so as to provide as much ruggedness as may be desired to compensate for stresses in the panel 20. Support members 16 and 17 also serve as heat sinks for heat generated by discharges and thus minimize the effect of temperature on operation of the device. If it is desired that only the memory function be utilized, then none of the members need be transparent to light.

Except for being nonconductive or good insulators the electrical properties of support members 16 and 17 are not critical. The main function of support members 16 and 17 is to provide mechanical support and strength for the entire panel, particularly with respect to the pressure differential acting on the panel and thermal shock. They should have thermal expansion characteristics substantially matching the thermal expansion characteristics of the dielectric layers. Ordinary ¼ inch commercial grade soda lime plate glasses have been used for this purpose. Other glasses such as low expansion glasses or transparent devitrified glasses can be used provided they can withstand processing and have expansion characteristics substantially matching expansion characteristics of the dielectric coatings.

The spacers may be made of the same glass material as dielectric films and may be an integral rib or ribs formed around the outside of the area in which the gas is to be confined and on one of the dielectric members, and fused to the other member to form a bakeable hermetic seal enclosing and confining the ionizable gas volume. However, a separate, outer final hermetic seal may be effected by a high strength devitrified glass sealant, if desired. Tubulation is provided for exhausting the space between the dielectric members and filling that space with the volume of ionizable gas. For large panels small bead-like solder glass spacers may be located between conductor intersections and fused to the dielectric member to aid in withstanding stress on the panel and maintain uniformity of thickness of gas volume.

Conductor arrays 13 and 14 may be formed on support members 16 and 17 by a number of well-known processes, such as photoetching, vacuum deposition, stencil screening, etc. In one embodiment, the center-to-center spacing of conductors in the respective arrays is about 17 mils. Transparent, semi-transparent or opaque conductive material such as tin oxide, gold or aluminum can be used to form the conductor arrays and should have a resistance less than 3,000 ohms per line and preferably about 50 ohms per line. Narrow opaque electrodes may alternately be used so that discharge light passes around the edges of the electrodes to the viewer. It is important to select a conductor material that is not attacked during processing by the dielectric material.

It will be appreciated that conductor arrays 13 and 14 may be wires or filaments of cooper, gold, silver or aluminum or any other conductive metal or material. For example 1 mil wire filaments are commercially available and may be used in the invention. However, formed in situ conductor arrays are preferred since they may be more easily and uniformly placed on and adhered to the support plates 16 and 17.

The dielectric layer members are formed of an inorganic material and are preferably formed in situ as an adherent film or coating which is not chemically or physically effected during bake-out of the panel. One such material is a solder glass such as Kimble SG-68 manufactured by and commercially available from the assignee of the present invention.

This glass has thermal expansion characteristics substantially matching the thermal expansion characteristics of certain soda-lime glasses, and can be used as the dielectric layer when the support members 16 and 17 are soda-lime glass plates. The dielectric layers must be smooth and have a dielectric strength of about 1,000 v. and be electrically homogeneous on a microscopic scale (e.g., no cracks, bubbles, crystals, dirt, surface films, etc.) in addition, the surfaces of the dielectric layers should be good photoemitters of electrons in a baked-out condition. Alternatively, the dielectric layers may be overcoated with materials designed to produce good electron emission, as in U.S. Letters Patent No. 3,634,719, issued to Roger E. Ernsthausen. Of course, for an optical display at least one of the dielectric layers should pass light generated on discharge and be transparent or translucent and, preferably, both layers are optically transparent.

Typical center-to-center spacing between conductors in the arrays 13 and 14 is about 17 mils.

The ends of conductors 14–1 . . . 14–4 and support member 17 extend beyond the enclosed gas volume and are exposed for the purpose of making electrical connection to interface, logic control and addressing circuitry indicated generally at 19. Likewise, the ends of conductors 13–1 . . . 13–4 on support member 16 extend beyond the enclosed gas volume and are exposed for the purpose of making electrical connection to interface and addressing circuitry 19.

As described in detail in the Baker et al., U.S. Pat. No. 3,499,167, the entire gas volume can be initially conditioned for subsequent operation at substantially uniform firing potentials by the use of internal or external radiation to supply free electrons throughout the gas medium.

Figure 3:
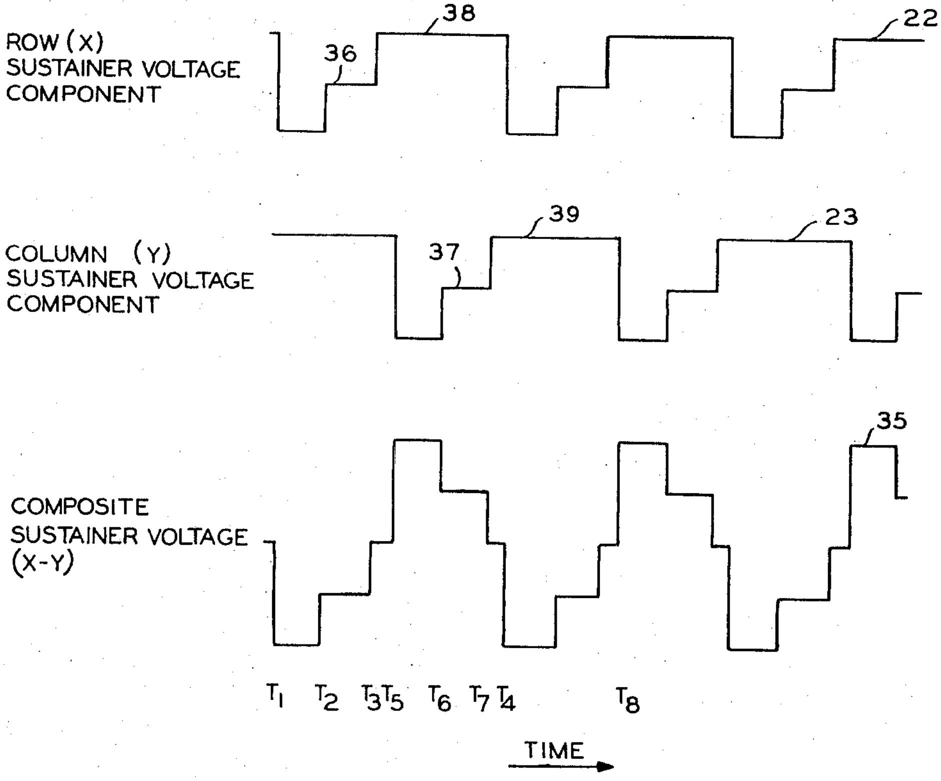
FIG. 3 shows waveforms of the row or *x* column or *y* components of the sustainer waveform and the composite waveform typical of those developed by circuits as shown in FIG. 2.

Normal operation of a panel of the type described herein will be described with reference to FIG. 1. Potentials having the waveforms 22 and 23 as shown in FIGS. 1 and 3 are supplied from row or *x* and column or *y* sustainer circuit generators 25, 26 via row and column pulsing and addressing circuits 28, 29 to conductor arrays 14, 13 in response to control pulses from row and column sections 31, 32, respectively of the logic control circuit 34. The resultant or composite potential wave form appearing across each cell is indicated at 35 in FIGS. 1 and 3 as a periodic waveform of an alternating character. The waveform 35 is derived for the purpose of analysis of the operation of the panel by assuming that the waveforms 22 and 23 are spaced 180° apart or are oppositely phased within the cycles of the periodic composite waveform 35, and that waveform 23 is subtracted from the waveform 22. Assigning the letter *x* to the row array 14, conductors 14–1 . . . 14–4 and the waveform 22 and the letter *y* to the column array 13, conductors 13–1 . . . 13–4 and the wave form 23, the composite wave is *x—y* as best seen in FIG. 3.

In the examples set forth in FIGS. 1 and 3, the waveforms 22 and 23 are square with pedestals 36 and 37 and a displacement from reference levels of a duration of less than one-half of the cycle defined by the composite waveform 35. Thus, more than 180° of the cycle of the composite waveform 35 elapses between displacements from the reference levels. Typically the component waveforms can be identical with reference levels of 110 volts, pedestal levels of 50 volts and maximum excursions to ground; however, it is to be understood that the components need not be identical and their magnitudes can be different. The logic inputs to the sustainer generators 25 and 26 are phased 180° apart with respect to the cycle of waveform 35. Therefore, the positive wave 23 is produced when the positive wave 22 is not being produced. When the positive waveform 23 is subtracted from the positive wave form 22, the wave form 23 appears to be negative in the composite wave form 35.

The voltage 22 from sustainer 25 constitutes approximately one-half of the sustaining voltage necessary to operate the panel, the remaining one-half which is necessary being supplied by voltage 23 phased 180° as noted above with respect to the voltage 22. Thus, one-half of the sustainer potential 35 is applied to each of the row conductors 14 and one-half of the sustainer potential 34 is applied to each of the column conductors 13. The sustainer circuits 25 and 26 advantageously have a common ground so that the panel 20 floats with respect to ground.

Individual cells or discharge sites located by the crossing of selected conductors or conductor arrays 14, 13 are manipulated by adding unidirectional voltage pulses at the proper time to each of the sustaining voltages on the selected conductors, which, when combined, are sufficient to exceed the firing potential for the selected cells and to initiate a sequence of discharges, one for each half-chcle of the applied composite sustaining potential 35. By also properly timing such unidirectional voltage pulses and applying them at a different portion in a cycle of the composite sustaining potential 35 to each of the sustaining voltages on the selected conductors, the sequence of discharges may be terminated. Thus, any individual discharge site may be manipulated "ON" or "OFF," by manipulation of the times of occurrences of the unidirectional voltage pulses.

The unidirectional voltage pulses are added to the sustainer voltages 22, 23 on the selected conductors by the row and column pulsing and addressing circuits 28, 29 in response to logic signals from the logic control circuit 34 via leads 31–1 through 31–4 and 32–1 through 32–4, respectively, to select the conductor pairs for the individual cells.

It will be noted that between the positive half-cycles 22 and the negative half-cycles 23 of the composite wave form 35 there are provided plateaus at the apparent zero voltage level indicating a brief time interval between the cessation of the generation of one-half cycle of the wave form 35 and the initiation of the other half-cycle of the waveform 35. These plateaus may be provided to reduce interference between operation of various circuits for reasons that need not be detailed here.

However, the plateaus provide an opportunity to discuss what happens as the composite sustaining voltage 35 periodically alternates between the opposite polarities derived by subtracting the waveform 23 from the waveform 22. As the waveform 35 goes from negative level of the subtracted waveform 23 to the zero level, a cell "displacement" current flow occurs and causes a positive current spike. As the waveform 35 goes from the zero level to its positive level 22, a second cell "displacement" current flow occurs and causes a second positive current spike.

Similarly, as the waveform 35 goes from the positive level 22 to the zero level, a negative "displacement" current spike is produced. As the waveform 35 goes from zero to the negative level of the subtracted waveform 23 a second negative "displacement" current spike occurs.

If separation plateaus are not provided then the spikes would occur at substantially the same time and a single resultant larger "displacement" current spike would occur when the composite waveform 35 reverses polarity.

If the cell in question has been manipulated to an "ON" condition as hereinbefore described, then the cell will discharge when the difference between the wall voltage built up from a previous discharge and the sustainer potential exceeds the firing potential necessary to discharge the cell. There then occurs a cell "discharge" current flow.

It is desirable that the cell not see any appreciable voltage change in the sustainer waveform during the discharge period, since this may interfere with the transfer of wall charge during the discharge, so that subsequent discharges every half-cycle of the sustainer waveform will continue to occur in a manner to maintain the cell "ON" in the condition required.

Row and column sustainer circuits 25, 26 are advantageously constructed using power transistors as output devices. It is desirable to be able to turn the power transistors "ON" and "OFF" as quickly as possible so that the transition slope in the waveform controlled by the power transistors is as steep as possible. To turn a power transistor "ON" quickly it is necessary to drive it with a comparatively large current pulse which will drive the transistor into deep saturation. The further the transistor is driven into saturation the smaller the internal resistance will be to the power output circuit it is controlling. If driven sufficiently far into saturation the "displacement" and "discharge" currents may flow freely through the transistor and there will be very little voltage drop across the transistor during the time the cell is discharging. Therefore, the voltage drop across the transistor will be very small during the discharge cycle of the cell, will make very little change as a subtraction to the composite sustainer waveform, and will not appreciably effect the transfer of wall charges during the discharge cycle of a cell.

The pedestals 36 and 37 of the waveforms provide convenient bases from which the discharge state manipulating partial select signals can be applied for addressing the panel to change the display and memory. Waveforms as illustrated in FIG. 3, while shown with instantaneous transitions between levels, in fact, have some time for each transition (not shown). Three voltage levels and thus three sections for imposing those levels are shown connected to the common sustainer output buss 41.

One transistor switch PDQ3 pulls the sustainer to ground level by effectively connecting its grounded emitter to the output 41 through its collector to pull down the sustainer voltage as at times $t_1$ and $t_5$ of waveforms 22 and 23. Next the sustainer component is pulled to a medium level below its reference level, typically about 50 volts, by switching "on" pull medium transistor PMQ3 at times $t_2$ and $t_6$ on curves 22 and 23 to apply $V_M$ from a high impedance source 40 connected to its collector to output 41 through its emitter. Pull-up transistor PUQ3 is switched "on" at times $t_3$ and $t_7$ for the respective sustainer component circuits on curves 22 and 23 to shift the waveform to its reference value $V_s$, a source of which is connected to its collector. Since these power transistors are operated in a saturated condition at or near their current capacities, a concurrent "on" state for two or more of the transistors can be destructive of their junctions by virtue of the excessive currents to which they would be subjected. Accordingly, the present system is arranged to avoid those destructive currents.

The high impedance source 40 limits the currents which are passed by PMQ3 to common output 41 and can be of a magnitude such that the concurrent turn on of PMQ3 and PDQ3 can be maintained without destroying either transistor. However, as the impedance is increased the switching characteristics of PMQ3 deteriorate and the sustainer waveform at $t_2$ or $t_6$ looses its sharpness thereby impairing the operating characteristics of the controls for panel 20. Diode 42 between the emitter of PMQ3 and common output 41 protects the transistor while the higher voltage $V_s$ is switched on output 41 by PUQ3.

Two input stages control each power transistor. TTL logic signals as a pull down "on" signal at terminal 43, a pull medium "on" signal at terminal 44 and a pull up "on" signal at terminal 45 are accommodated by the first stage and the second stage provides sufficient amplification to drive the power transistors.

First stage control transistors for pull down PDQ1, pull medium PMQ1 and pull up PUQ1 advantageously for their speed of operation are so biased that they are not driven into saturation. That is for the n-p-n transistors employed their bias is such that the collectors cannot become negative with respect to their bases. Positive or logic "1" clocking signals from TTL circuits, typically at about 3.5 volts are employed as "turn on" signals at 43, 44 and 45 to the bases of the first stage transistors PDQ1, PMQ1 and PUQ1. These signals are of relatively short duration. They result in signals at their collectors which turn on the second stage transistors.

Transistors PDQ2, PMQ2 and PUQ2 are of the p-n-p type with collectors coupled to ground through the primaries of isolation transformers 46 and 47 in the case of PMQ2 and PUQ2 and through a bias resistor 48 for PDQ2. They impose the relatively large base currents on the power transistors for their "turn on." The isolation transformers are employed in the case of PMQ3 and PUQ3 where the respective emitters float with the square wave output to produce the pedestal 36 or 37 and the reference values $V_s$ of voltage so that the base can move with the square wave output. In the case of PDQ3 the base can be grounded through bias resistor 48 since the transistor is tied to ground. Again, rapid operation of the second stage transistors is desired and they are biased as to avoid being driven into saturation, that is they are biased to avoid having the collector become positive with respect to the base. Rapid operation can also be achieved if the transistors of each stage have short storage time of charge carriers.

In operation it is desired that the TTL signals result in essentially instantaneous turn on of the respective power transistors. As previously noted the absence of load in the common output line provides no limit on the current developed where two power transistors are on concurrently and this establishes a condition in which excessive currents can flow to ground destroying the transistor junctions. Such concurrent "turn on" signals can arise from various sources such as a malfunction in the transistor logic or by spurious noise signals and can be in the form of simultaneous "turn on" signals, overlapping "turn on" signals or even partial "turn on" signals.

Concurrent imposition of "turn on" conditions in the first and second stages of the pull down, pull medium and pull up control transistors is prevented by connecting the emitters of the transistors in each stage to a common emitter resistor 51 for the first stage and 52 for the second stage. In the case of the first stage n-p-n transistors PDQ1, PMQ1 and PUQ1 the common emitter resistor 51 is connected to ground and is of a magnitude to have a positive voltage drop which when combined with the transistor's base-emitter junction drop puts a reverse bias on the other two transistors of that stage which is equal to the amplitude of the TTL input signals. For example, if the input signals are +3 volts as a "turn on" level and the base-emitter junction drop is 0.7 volts, the on state of one of transistors PDQ1, PMQ1 or PUQ1 will develop at least a 2.3 volt drop across common emitter resistor 51.

Simultaneous turn on signals are militated against by introducing a voltage margin in the input signal circuits to one or more of the first stage transistors. PUQ1 pull up control transistor will be turned on after PMQ1 or PDQ1 even though subjected to a "turn on" signal simultaneously with one of the others since diode 53 in its base circuit has a forward drop of about 0.7 volt to signals applied at 45, which on a rising "turn on" pulse will cause one of the other first stage control transistors to conduct first. Such condition will develop the reverse bias in resistor 51 to prevent turn on of PUQ1. Diode 53 blocks the transition of the TTL input to zero on "turn off" hence resistor 54 to ground is provided as a means of returning the base of PUQ1 to ground when the "turn on" signal at input 45 is removed.

Inhibits for simultaneous turn on of PMQ1 have not been utilized since, as explained above, the high impedance source 40 for PMQ3 offers protection if that switch is closed with PDQ3.

The second stage control transistors are also arranged to reduce the possibility of more than one transistor being on at one time. The emitters of these p-n-p transistors are connected to a positive potential through a common emitter resistor 52 which functions in the manner of resistor 51. Any "on" input to the second stage transistor bases will cause a negative voltage drop across the common resistor 52, thereby putting a reverse bias on the other two transistors equal to the amplitude of the normally imposed input signals. Thus at either the first or second stage, input signals, either derived from logic malfunctions, or noise, which are of a "turn on" or partial "turn on" level are rendered ineffective on a second circuit while a first circuit is on.

It should be noted that individual emitter resistors have been employed in the past for control transistors for the output power transistors. Common emitter resistors in addition to their improved operation also enable the number of circuit elements in the sustainer sources to be reduced.

Various forms of sustainer waveform circuits adapt themselves to the utilization of the disclosed interlocked circuits employing common emitter resistors and voltage margin imposing base diodes. As disclosed, the sustainer waveform is generated by the power transistors PDQ3, PMQ3 and PUQ3 effectively operated for precise portions of the sustainer cycle period by turn on controls which carry them into saturation. Some applications establish this "turn on" interval for the power transistors, the intervals between $t_1$ and $t_2$, between $t_2$ and $t_3$ and between $t_3$ and $t_4$ for PDQ3, PMQ3 and PUQ3 of the $x$ or row sustainer component respectively, by driving them into deep saturation with "turn on" controls and the requisite time after the "turn on" by applying a turn off signal which draws the carriers out of the collector-base junctions to provide a sharp "turn off" from the saturated condition. In the present system, illustrated in its simplest form, the rapid response of the first and second stage control transistors to the precisely timed clocking signals at terminals 43, 44 and 45 and the characteristics in the saturated condition of the power transistors are relied upon to produce the desired "on" intervals. Turn off resistors 56 and 57 are connected between the emitters and base of PMQ3 and PUQ3 to enhance turn off characteristic. That is the power transistors are driven into saturation to a degree and for a time in the initial portion of their on interval, as determined by the clocking signal and the first and second stage controls, and the "on" signal removed such that they will be effectively off at the time the next switch is turned on. This means that when the pull medium switch PMQ3 is turned on the ground coupling through pull-down switch PDQ3 is either off or so nearly off as to not adversely effect the sustainer component. In the case of the pull high switch the pull down switch is completely off and the pull medium switch nearly off. Further diode 42 bars flow from the positive $V_s$ source through the circuits of PMQ3.

While three switches have been shown, more complex sustainer waveforms can be produced employing more than three switches in a component waveform circuit to develop more than three potential levels. Further, an operative waveform can be derived from only a pull-up and a pull-down switch. In each instance cross inhibits of the controls for the several switches are desirable and the common emitter reverse biasing and single and/or multiple diode forward drops as a means of establishing voltage margins are of particular advantage. Accordingly, it is to be understood that the above detailed disclosure is to be read as illustrative of the invention and not in a limiting sense.

What is claimed is:

1. In a system for supplying operating potentials to a load device wherein at least one of two transverse oriented, spaced conductors is isolated by a dielectric layer from a gas discharge medium, said gas being spatially related to the spaced conductors to provide a discharge site for gas ionized in response to potentials imposed between said conductors, comprising a source of a relatively high direct current potential; a source of a relatively low direct current potential; an output connection to one of said conductors; a first power transistor connected between said high potential source and said output connection and operated as a normally open switch; a second power transistor connected between said low potential source and said output connection operated as a normally open switch; a control means for each of said power transistors to transfer its respective transistor between an open switch and closed switch condition; a clocking means for periodically operating said respective control means for each power transistor to transfer said power transistor between an open switch and closed switch condition; and inhibiting means responsive to any one of said control means being operated to transfer its respective power transistor to a closed switch condition for inhibiting operation of other of said control means to transfer its respective power transistor to a closed switch condition whereby, said relatively high direct current potential is applied to said conductor during the time said first power transistor is in a closed switch condition and said relatively low direct current potential is applied to said conductor during the time said second power transistor is in closed switch condition and said inhibiting means is effective to prevent coincident on switching states of said power transistors.

2. A system according to claim 1 wherein said control means each include a transistor, said transistor of said control means being connected in a common emitter configuration and wherein said inhibiting means is an emitter resistor common to the emitter circuits of each control transistor.

3. A system according to claim 2 wherein said clocking means issues a signal of a given voltage level to each of a plurality of said control transistors and wherein said resistor is so proportioned to the current it passes in response to a control means being operated to transfer its respective power transistor to a closed switch condition as to impose on the other control means a reverse bias equal to the given voltage level.

4. A system according to claim 1 wherein said control means each include a n-p-n transistor and said inhibiting means comprises a grounded emitter resistor common to the emitter circuits of said n-p-n transistors and so proportioned to the current it passes in response to a control means being operated to transfer its respective power transistor to a closed switch condition as to impose on the other n-p-n transistor a reverse bias.

5. A system according to claim 1 wherein said control means each include a p-n-p transistor and said inhibiting means comprises an emitter resistor common to the emitter circuits of said p-n-p transistors and connected to a positive voltage, said resistor being so proportioned to the current it passes in response to a control means being operated to transfer its respective power transistor to a closed switch condition as to impose on the other p-n-p transistors a reverse bias.

6. A system according to claim 1 including means to introduce a voltage margin on one of said control means to establish a preference in operation to a given control means in response to signals applied to said control means.

7. A system according to claim 6 wherein said voltage margin means biases the control means to which it is applied against operation to transfer its respective power transistor to a closed switch condition.

8. A system according to claim 6 wherein said voltage margin means is a rectifying diode having a forward drop and including a grounded resistor between said diode and said one control means.

9. A system according to claim 1 wherein each of said control means comprises a first section and a second section and said inhibiting means includes means responsive to operation of a first section in a manner to transfer its respective power transistor to a closed switch condition to inhibit operation of the remainder of said first sections and means responsive to operation of a second section in a manner to transfer its respective power transistor to a closed switch condition to inhibit operation of the remainder of said second sections.

10. A system according to claim 1 including a source of a potential intermediate said low and high potentials; and a power transistor connected between said intermediate potential source and said output and operated as a normally open switch.

* * * * *